Feb. 10, 1931.    K. E. WENZEL    1,792,206

WEIGHT AUTOMATIC RAIL BRAKE

Filed April 30, 1929

Witnesses:

Inventor:

Patented Feb. 10, 1931

1,792,206

UNITED STATES PATENT OFFICE

KARL ERNST WENZEL, OF HAMBORN-ON-THE-RHINE, GERMANY

WEIGHT AUTOMATIC RAIL BRAKE

Application filed April 30, 1929, Serial No. 359,237, and in Germany December 18, 1925.

Weight-automatic rail brakes have become known, in which the track rail is stationary and the brake lifted when it has to be brought into operative position. From weight-automatic rail brakes of this type the brake according to the invention differs in that, for regulating the braking effect, the track rail is arranged so that it can be lifted and lowered, and it is connected to a lifting device so that in this case the carrier for the brake rail can be stationarily mounted. By the lifting of the track rail the brake rail, on which the wheel has run, is relieved, i. e. the brake pressure reduced, whilst inversely by lowering the track rail the loading of the brake rail and thereby the brake pressure is increased. The brake rail is hereby permanently in the same predetermined position of height.

Figure 1:
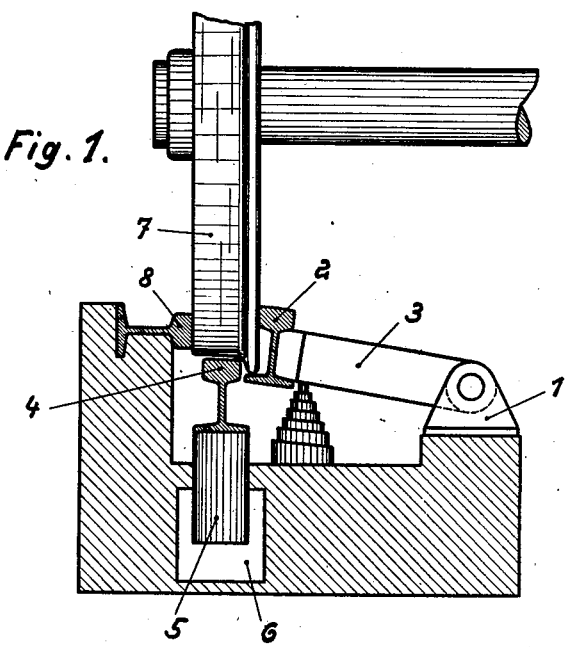
Figure 2:
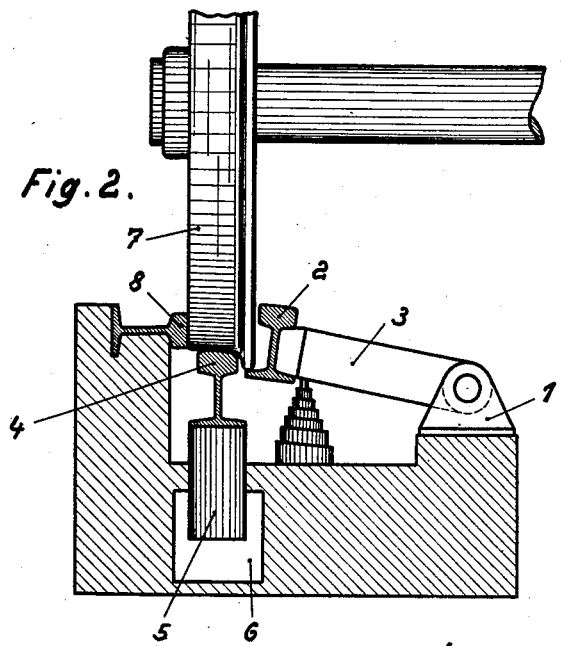

In the accompanying drawing one form of construction of the invention is illustrated, in which Figs. 1 and 2 show the new rail brake in inoperative and operative position respectively.

In the form of construction shown the bearing 1 for the oscillatable lever 3 carrying the movable brake rail 2 is stationary. The track rail 4 is adapted to be lifted and lowered and mounted on a piston 5 of a pressure cylinder 6. The braking is effected, as shown in Fig. 1, by the wheel 7 running up on the foot of the brake rail 2 so that it makes the same tip the wheel being thereby clamped between the head of the brake rail 2 and the head of a counter rail 8. By lifting the track rail 4 the brake rail 2 can be relieved, whereby the brake pressure is reduced. The actual braking effect is therefore dependent of the adjusting of the track rail.

I claim:

1. A weight-automatic rail brake with separate track rail and brake rail, comprising in combination with the track rail shiftable in vertical direction a lifting device to which said track rail is connected.

2. A weight-automatic rail brake with separate track rail and brake rail, comprising in combination with the track rail shiftable in vertical direction an adjustable counter force, to which said track rail is connected.

In testimony whereof I have hereunto set my hand.

KARL ERNST WENZEL.